Aug. 29, 1950     J. O. THORNDIKE     2,520,700

ATTACHMENT FOR ADJUSTING THE PITCH OF A LEVEL BODY

Filed May 13, 1948

Inventor:
James O. Thorndike,
by Heard Smith & Tennant
Attorneys

Patented Aug. 29, 1950

2,520,700

UNITED STATES PATENT OFFICE 2,520,700

ATTACHMENT FOR ADJUSTING THE PITCH OF A LEVEL BODY

James O. Thorndike, Whitman, Mass.

Application May 13, 1948, Serial No. 26,751

4 Claims. (Cl. 33—214)

This invention relates primarily to a device for determining the inclination or pitch of a surface beam pipe or other object relatively to a horizontal plane and the object thereof is to provide an industrial level of a usual type commonly known as a spirit level such as is used by carpenters, plumbers, and other artisans, with means cooperating with the level when the level is in true horizontal position from which the inclination or pitch of the object relatively to the horizontal can be readily determined.

A further object of the invention is to provide as an article of manufacture an attachment adapted to be applied to a usual industrial form of spirit level which may be employed to determine the pitch of an inclined object relatively to the horizontal and which will not interfere with the usual use of the level.

A further object of the invention is to provide a level of the usual type having means adapted to be embodied in or applied to an industrial level having means for indicating when the level is in a vertical position which may be employed to determine the inclination or pitch of an upwardly extending object relatively to the vertical.

A further object of the invention is to provide a fixture adapted to be secured to one end of an industrial level which may be employed to accomplish either or both of the above purposes.

These and other objects and features of the invention will more fully appear from the following description and the accompanying drawings and will be particularly pointed out in the claims.

Figure 1:
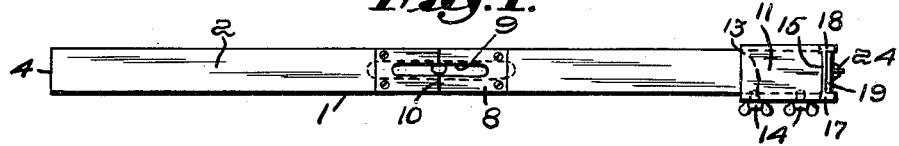
Fig. 1 is a plan view of a usual type of industrial level with the pitch-determining attachment applied thereto.

A usual form of industrial spirit level comprises a bar or beam 1 of any predetermined length such, for example, as 2' in length, and of uniform cross sectional area, having a flat upper surface 2 usually of approximately 1½" width, and a flat lower surface 3 parallel thereto, the bar being approximately 3" in depth, with the respective ends 4 and 5 of the bar truly perpendicular to the upper and lower surfaces thereof. The bar is provided intermediate of its length with a horizontal transparent tube 6 extending longitudinally of and embedded in the bar and partially filled with a suitable liquid, such as alcohol, having a bubble 7 therein adapted when centered longitudinally of the tube to indicate that the bar is in true horizontal position. A flat metal plate 8, which overlies the tube 6, is secured to the upper surface of the bar and is provided with a longitudinal slot 9 and has a scratch line 10 defining the center of the tube so that when the bubble appears centrally in alinement of the scratch line it indicates that the bar is truly horizontal.

Figure 2:
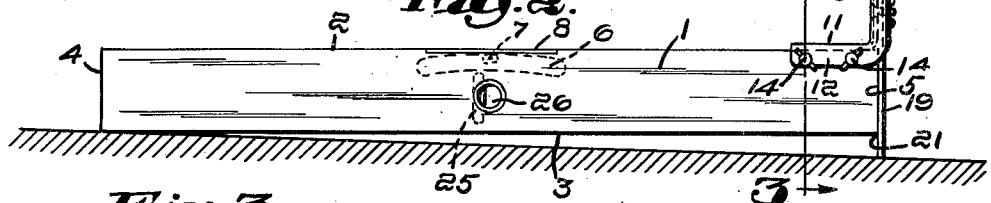
Fig. 2 is a side elevation of the same showing the pitch-determining device as applied to an inclined object such as a floor which, as illustrated, is inclined downwardly from the left toward the right.
Figure 3:
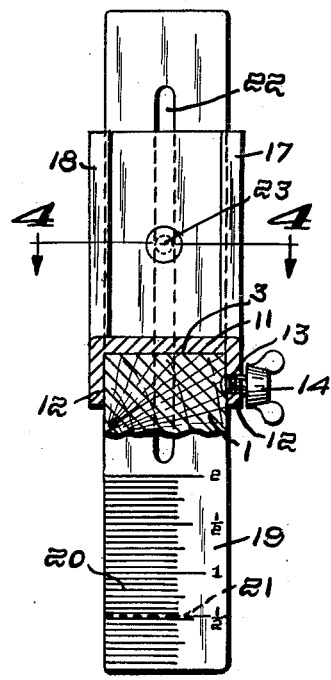
Fig. 3 is a vertical sectional view on line 3—3 Fig. 2, viewed in the direction indicated by the arrows and a portion of the depth of the bar of the level broken away.
Figure 4:
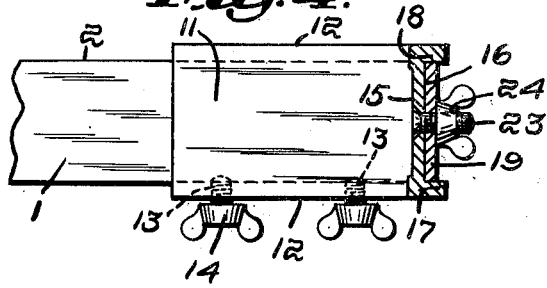
Fig. 4 is a horizontal transverse sectional view on line 4—4 Fig. 3.

The means cooperating with the level to determine the pitch of an object comprises an L-shaped fixture of metal or other suitable material having a flat base 11 adapted to engage the upper flat surface 2 of the end portion of the bar 1 with means for securing the same thereto. In the preferred construction the horizontal member of the L-shaped fixture is provided with parallel flanges 12 extending downwardly alongside the respective sides of the bar 1 and set screws 13, preferably having winged nuts 14, which are mounted in one of the flanges 12, engage one of the sides of the bar 1 thereby fixedly securing the base 11 to the end portion of the bar. The upwardly extending section 15 of the fixture is provided with a flat face 16 which is in alinement with the plane of the end 5 of the bar and desirably the upwardly extending section 15 is provided with parallel flanges 17 and 18 extending beyond the face 16 and providing a guideway for the edges of a flat plate 19 which extends over the end 5 of the bar in contact therewith and is adapted to be extended beyond the lower surface 3 of the bar 1, as shown in Fig. 2.

A suitable scale and an index cooperating therewith are provided for measuring the distance the plate 5 is extended beyond the lower surface of the bar 1 into engagement with the object the pitch of which is to be determined. In the preferred construction illustrated a scale 20 graduated in units, such as inches and fractions thereof, is applied to the lower end of the plate 19 reading upwardly from the bottom thereof and the end 21 of the lower surface 3 of the bar 1 which engages the plate 19 serves as an index cooperating with the scale to enable the distance the scale is projected beyond the lower surface 3 of the bar to be read.

Any suitable means may be provided for locking the scale bearing plate 19 in adjusted position. In the preferred construction illustrated the plate 19 is provided centrally of its width with a longitudinally extending slot 22 and a bolt 23 which is anchored in the upwardly extending section 15 of the fixture extends through the slot 22 and is preferably provided with a winged nut 24 adapted to clamp the plate 19 in adjusted positions.

In the operation of the device the scale-bearing end of the plate 19 and the under face 3 of the bar 1 are placed in engagement with the inclined object or surface the pitch of which is to be determined and the bar 1 of the level adjusted relatively thereto until the bubble 7 in the tube comes into registry with the scratch lines 10 on the plate 8, thereby indicating that the bar is in perfectly horizontal position. The distance of the lower face of the bar from the end of the plate 19 is read at the under surface 21 of the bar which engages the scale and the ratio of the distance thus measured on the scale to the length of the bar thereby determines the pitch of the object relatively to the horizontal.

By reason of this construction a level is provided which can be readily manipulated by an artisan to determine the pitch of any object relatively to the horizontal such, for example, as the inclination of a floor or the inclination of a pipe to provide for proper flow of liquid therethrough, or the inclination of any other object to the horizontal.

The level may also have means for determining the inclination of a post or any other device relatively to the vertical. To provide for such use the bar may be provided intermediate of its length with a similar bubble-containing tube 25 embedded therein perpendicular to the faces 2 and 3 of the bar and an index associated therewith to show when the longitudinal center of the bubble is in registry therewith that the bar is in true vertical position with a sight hole 26 extending through the bar enabling the position of the bubble to be observed.

A further object of the invention is to provide a fixture of the character above described which can be produced as an article of manufacture and which can be readily marketed for application to an industrial level of the character above described.

It will be understood that the particular embodiment of the invention shown and described herein is of an illustrative character and that various modifications in construction of the fixture and arrangement of parts may be made to enable it to be applied to other forms of levels within the meaning and scope of the following claims.

Having thus described the invention, what is claimed as new, and desired to be secured by Letters Patent, is:

1. A pitch determining fixture for an industrial spirit level of the type having a straight beam of predetermined length and of uniform rectangular cross sectional area with flat faces and having flat ends perpendicular to the longitudinal axis of the beam and having intermediate of the length of the beam means for visually indicating when the beam is in truly horizontal position, said fixture comprising an L-shaped bracket having a base section provided with a flat face to engage the flat surface of an end portion of one of the sides of the beam, and an integral section perpendicular thereto having a flat face adapted to be positioned in accurate alinement with the flat end of the beam, parallel flanges extending from the base section of the bracket along the sides of the beam, suitably spaced clamping screws in one of said flanges to engage the side of the beam adjacent thereto and parallel flanges extending from the edge portions of the perpendicular section forming a guideway, a flat measuring plate slidably mounted in said guideway adapted to be extended beyond the lower face of said base section, a scale on said measuring plate graduated in units and fractions thereof adapted in cooperation with the lower face of said base section visually to indicate the distance of the lower end of the measuring section therefrom, and means for locking the scale bearing plate in adjusted position, whereby when the end of said plate and the lower face of the opposite end of the bar are placed upon an inclined object and the measuring plate adjusted to place the bar in horizontal position the pitch of the inclined object may be determined from the ratio of the reading of the scale to the length of the bar.

2. A pitch determining fixture for an industrial spirit level as in claim 1, in which the scale is graduated from its lower end upwardly and adapted when in registry with the lower flat surface of the bar to measure the distance therebetween.

3. A pitch determining fixture for an industrial spirit level as in claim 1, in which the measuring plate is provided with a slot extending longitudinally centrally of the measuring plate and the vertical section of the bracket has a bolt anchored therein and extending through said slot and provided with a winged nut for clamping the plate to the vertical section in adjusted positions.

4. A pitch determining fixture for an industrial spirit level as in claim 1, adapted to be applied to one end portion of an industrial spirit level having means for visually indicating when the bar is in true horizontal or true vertical position, whereby when the face of the bar beyond which the measuring plate may be extended is placed upon a horizontally inclined or a vertically inclined object and the measuring plate so adjusted as selectively to place the bar in horizontal or in vertical position the inclination of the object to the horizontal or to the vertical may be determined from the ratio of the reading of the scale on the measuring plate to the length of the bar.

JAMES O. THORNDIKE.

REFERENCES CITED

The following references are of record in the file of this patent:

UNITED STATES PATENTS

| Number | Name | Date |
|---|---|---|
| 140,055 | Marston | June 17, 1873 |
| 423,484 | Martin | Mar. 18, 1890 |
| 527,815 | Schnell | Oct. 23, 1894 |
| 711,880 | Ovens | Oct. 21, 1902 |
| 1,460,989 | Tiffany | July 3, 1923 |

FOREIGN PATENTS

| Number | Country | Date |
|---|---|---|
| 3,258 | Switzerland | 1891 |